US005904852A

United States Patent [19]
Tour et al.

[11] Patent Number: 5,904,852
[45] Date of Patent: May 18, 1999

[54] PROCESS FOR PURIFYING FULLERENES

[75] Inventors: James M. Tour, Columbia; Walter A. Scrivens, Newberry; Adam M. Rawlett, Columbia, all of S.C.

[73] Assignee: University of South Carolina

[21] Appl. No.: 08/838,275

[22] Filed: Apr. 16, 1997

[51] Int. Cl.$^6$ ................................................ B01D 15/08
[52] U.S. Cl. ...................... 210/635; 210/656; 210/198.2; 423/445 B
[58] Field of Search ...................... 210/635, 656, 210/198.2, 502.1; 423/445 B, 460, 461

[56] References Cited

U.S. PATENT DOCUMENTS

| | | | |
|---|---|---|---|
| 5,308,481 | 5/1994 | Stalling et al. | 219/198.2 |
| 5,310,532 | 5/1994 | Tour et al. | 423/445 B |
| 5,487,831 | 1/1996 | Pirkle | 210/198.2 |
| 5,698,174 | 12/1997 | Muller | 210/656 |

FOREIGN PATENT DOCUMENTS

| | | | |
|---|---|---|---|
| WO9325473 | 12/1993 | WIPO | 210/198.2 |

OTHER PUBLICATIONS

Whetten et al., "Spectroscopic and Photophysical Properties of the Soluble $C_n$ Molecules, n=60, 70, 76/78, 84," pp. 639–651, Materials Research Society Symp. Proc. vol. 206, 1991.
Heath et al., "$C_{60}$ Research at the University of California at Berkeley," pp. 667–671, Materials Research Society Sump. Proc. vol. 206, 1991.
A. V. Kiselev, "Adsorbents in Gas Chromatography," pp. 127–143, Advances in Chromatography, vol. 4, 1967.
J. V. Dawkins, "Gel Permeation Chromatography," pp. 337–366, Techniques in Liquid Chromatography, 1982.
Scrivens et al., "Chemical Communications," pp. 1207–1209, J. Chem. Soc., Chemical Communications, Issue 15, 1993.
Scrivens et al., "Single Column Purification of Gram Quantities of C70," pp. 6939–6940, Journal of the American Chemical Society, 116, 1994.
Bhyrappa et al., "Improved Chromatographic Separation and Purification of $C_{60}$ and $C_{70}$ Fullerenes," pp. 936–937, J. Chem. Soc., Chem. Commun., 1992.
Ruoff et al., "Solubility of $C_{60}$ in a Variety of Solvents," pp. 3379–3383, J. Phys. Chem. 98, 1993.
Scrivens et al., "Single Column Purification of Gram Quantities of $C_{70}$," pp. 6939–6940, J. Am. Chem. Soc. 116, 1994.
McKean et al., "Synthesis of Functionalized Styrenes via Palladium–Catalyzed Coupling of Aryl Bromides with Vinyl Tin Reagents," pp. 422–424, J. Org. Chem. 52, 1987.
Sivaraman et al., "Solubility of $C_{60}$ in Organic Solvents," pp. 6077–6079, J. Org. Chem. 57, 1992.
Trost et al., "Sulfur–Substituted Dienes and the Silylene Protecting Group in Systhesis, Deoxypillaromycinone," pp. 3253–3265, J. Org. Chem. 48, 1983.
Tour et al., "A Zirconium–Promoted Methylenation of Aldehydes, Ketones, and Enones," pp. 2937–2930, Tetrahedron Letters, vol. 30, No. 30, 1989.
Gügel et al., "Separation of $C_{60}$ and $C_{70}$ on polystyrene gel with toluene as mobile phase," pp. 23–29, Journal of Chromatography, 628, 1993.
Scrivens et al. "Potent Solvents for $C_{60}$ and Their Utility for the Rapid Acquisition of $^{13}$C NMR Data for Fullerenes," pp. 1207–1209, J. Chem. Soc., Chem. Commun., 1993.
Baum, "Flood of Fullerene Discoveries Continues Unabated," pp. 25–31, Chemical and Engineering News, Jun. 1, 1992.
Pradeep et al., "Preparation of Buckminsterfullerene, $C_{60}$," pp. 1101–1105, Mat. Res. Bull., vol. 26, 1991.
Krätschmer et al., "The infrared and ultraviolet absorption spectra of laboratory–produced carbon dust: evidence for the presence of the $C_{60}$ molecule," pp. 167–170, Chemical Physics Letters, vol. 170, No. 2,3, Jul. 6, 1990.
Hare et al., "Preparation and UV/visible spectra of fullerenes $C_{60}$ and C70," pp. 394–398, Chemical Physics Letters, vol. 177, No. 4,5, Mar. 1, 1991.
Vassallo et al., "Improved Separation of Fullerene–60 and–70," pp. 60–61, J. Chem. Soc., Chem. Commun. 1992.
Taylor et al., "Isolation, Separation and Characterisation of the Fullerenes $C_{60}$ and $C_7$: The Third Form of Carbon," pp. 1423–1425, J. Chem. Soc., Chem. Commun., 1990.
Peters et al., "A New Fullerene Synthesis," pp. 223–224, Angew. Chem. Int. Ed. Engl. 31, No. 2, 1992.
Still et al., "Rapid Chromatographic Technique for Preparative Separations with Moderate Resolution," pp. 2923–2925, J. Org. Chem., vol. 43, No. 14, 1978.
Meier et al., "Efficient Preparative Separation of $C_{60}$ and $C_{70}$ Gel Permeation Chromatography of Fullerenes Using 100% Toluene as Mobile Phases," pp. 1924–1926, J. Org. Chem., 57, 1992.
Chatterjee et al., "Fast One–Step Separation and Purification of Buckminsterfullerene, $C_{60}$ from Carbon Soot," pp. 3253–3254, J. Org. Chem., 57, 1992.
Khemani et al., "A Simple Soxhlet Chromatographic Method for the Isolation of Pure $C_{60}$ and $C_{70}$," pp. 3254–3256, J. Org. Chem., 57, 1992.
Koch et al., "Preparation of Fullerenes with a Simple Benchtop Reactor," pp. 4543–4545, J. Org. Chem., 56, 1991.
Ajie et al., "Characterization of the Soluble All–Carbon Molecules $C_{60}$ and $C_{70}$," pp. 8630–8633, J. Phys. Chem., 94, 1990.
Haufler et al., "Efficient Production of $C_{60}$ (Buckminsterfullerene), $C_{60}H_{36}$, and the Solvated Buckide Ion," pp. 8634–8636, J. Phys. Chem., 94, 1990.
Shinohara et al., "Formation and Extraction of Very Large All–Carbon Fullerenes," pp. 8449–8451, J. Phys. Chem., 95, 1991.

(List continued on next page.)

*Primary Examiner*—Ernest G. Therkorn
*Attorney, Agent, or Firm*—Dority & Manning, P.A.

[57] ABSTRACT

A process for separating $C_{60}$, $C_{70}$, and higher fullerenes above $C_{70}$ is provided. The process employs a chromatographic column utilizing a functionalized aromatic-containing resin as the stationary phase, an organic solvent as the mobile phase, and a mixture of fullerenes dissolved in the mobile phase.

19 Claims, No Drawings

OTHER PUBLICATIONS

Zhennan et al., "Buckminsterfullerene $C_{60}$: Synthesis, Spectroscopic Characterization, and Structure Analysis," pp. 9615–1918, The Journal of Physical Chemistry, vol. 95, No. 24, Nov. 28, 1991.

Parker et al., "High–Yield Synthesis, Separation, and Mass–Spectrometic Characterization of Fullerenes $C_{60}$ to $C_{266}$," pp. 7499–7503, J. Am. Chem. Soc., 113, 1991.

Pradeep et al., "A Novel $FeC_{60}$ Adduct in the Solid State," pp. 2272–2273, J. Am. Chem. Soc., 114, 1992.

Diederich et al., "The Higher Fullerenes: Isolation and Characterization of $C_{76}$, $C_{84}$, $C_{90}$, $C_{94}$, and $C_{70}O$, an Oxide of $D_{5h}$–$C_{70}$," pp. 548–551, Science, vol. 252, Apr. 26, 1991.

Diederich et al., "Fullerenes Isomerism: Isolation of $C_{2v}$–$C_{78}$ and $D_3$–$C_{78}$," pp. 1768–1770, Science Vo. 254, Dec. 20, 1991.

Kroto et al., "$C_{60}$: Buckminsterfullerene," pp. 162–163, Nature Vo. 318, Nov. 14, 1985.

Krätschmer et al., "Solid $C_{60}$: a new form of carbon," pp. 354–358, Nature Vo. 347, Sep. 27, 1990.

Howard et al., "Fullerenes $C_{60}$ and $C_{70}$ in flames," pp. 139–141, Nature Vo. 352, Jul. 11, 1991.

Jinno et al., "Liquid chromatographic separation of all–carbon molecules $C_{60}$ and $C_{70}$ with multi–legged phenyl group bonded silica phases," pp. 105–109, Journal of Chromatography, 594, 1992.

Wudl, "The Chemical Properties of Buckminsterfullerene ($C_{60}$) and the Birth of Infancy of Fulleroids," pp. 157–161, Acc. Chem. Res., 25, 1992.

Johnson et al., "Fullerene Structure and Dynamics: A Magnetic Resonance Potpourri," pp. 169–175, Acc. Chem. Res., 25, 1992.

McElvany et al., "Characterization of Fullerenes by Mass Spectrometry," pp. 162–168, Acc. Chem. Res., 25, 1992.

Hawkins, "Osmylation of $C_{60}$: Proof and Characterization of the Soccer–Ball Framework," pp. 150–156, Acc. Chem. Res., 25, 1992.

Weaver, "Fullerenes and Fullerides: Photoemission of Scanning Tunneling Microscopy Studies," pp. 143,149, Acc. Chem. Res., 25, 1992.

Fagan et al., "Metal Complexes of Buckminsterfullerene ($C_{60}$)," pp. 134–142, Acc. Chem. Res., 25, 1992.

Haddon, "Electronic Structure, Conductivity, and Superconductivity of Alkali Metal Doped $C_{60}$," pp. 127–133, Acc. Chem. Res., 25, 1992.

Diederich et al., "Beyond $C_{60}$: The Higher Fullerenes," pp. 119–126, Acc. Chem. Res., 25, 1992.

Hare et al., "A Postbuckminsterfullerene View of Carbon in the Galaxy," pp. 106–112, Acc. Chem. Res., 25, 1992.

Fischer et al., "Solid–State Chemistry of Fullerene–Based Materials," pp. 112–118, Acc. Chem. Res., vol. 25, No. 3, 1992.

Smalley, "Self–Assembly of the Fullerenes," pp. 98–105, Acc. Chem. Res., vol. 25, 1992.

Scrivens et al., "Purification of Gram Quantities of $C_{60}$. A New Inexpensive and Facile Method," pp. 7917–7919, J. Am. Chem. Soc., vol. 114, Sep. 23, 1992.

Walling et al., "Substituted Styrenes: I. The Decarboxylation of Substituted Cinnamic Acids," pp. 852–854, J. Am. Chem. Soc., vol. 69, Apr. 1947.

J. Gong et al., "New method for highly efficient separation and purification of $C_{60}$," Chemical Abstracts, p. 1093, vol. 122, No. 6, abstract No. 70419e, Feb. 6, 1995.

Kirk and Othmer, "Preparation of Active Carbons" and "Nature of the Active Carbon Surface," Encyclopedia of Chemical Technology, vol. 2, pp. 886–890, 1948.

Hodge et al., "Polymer–Supported Reactions in Organic Synthesis," Polymer Supports, pp. 13–20, 1980.

Derwent Publications Ltd., AN 93–148962, Apr. 1993.

Derwent Abstracts Ltd., JP,A,5 085 711, Apr. 1993.

PROCESS FOR PURIFYING FULLERENES

GOVERNMENT RIGHTS

This invention was made with the support of the United States government under National Science Foundation Grant Nos. DMR-9158315 and EHR-9108772 and the Office of Naval Research Grant No. N00014-96-1-0088. The government has certain rights in this invention.

FIELD OF THE INVENTION

The present invention is directed to the purification of fullerenes and, in particular, $C_{60}$, $C_{70}$ and the higher fullerenes using column chromatography. A process for separating $C_{60}$, $C_{70}$ and higher fullerenes above $C_{70}$ is provided. The process employs a chromatographic column utilizing an aromatic-containing resin as the stationary phase.

BACKGROUND OF THE INVENTION

A fullerene is a form of pure carbon that is arranged in a three dimensional cage-like structure. These structures are generally spherical or oblong with a central cavity. They are molecules having the formula $C_{20+2m}$, wherein m is an integer. Use of the term "fullerene" herein refers to any fullerene or fullerene derivative, including metal encapsulating fullerene derivatives or metallic fullerene endohedral complexes, metallic fullerene exohedral complexes, and substituted fullerene derivatives or fulleroids.

The discovery of Buckminsterfullerene, a $C_{60}$ spherical allotrope of carbon, as disclosed in Kroto, H. W., Heath, J. R., O'Brien, S. C., Carl, R. F., Smalley, R. E.; "$C_{60}$: Buckminsterfullerene"; 318 Nature, pp. 162–163 (November 1985), precipitated a flurry of activity directed to understanding the nature and properties of fullerenes. Since their discovery, they have been evaluated for their use as lubricants, semiconductors and superconductors.

Fullerenes have been synthesized by ablating graphite with a laser, by burning graphite in a furnace, and by producing an arc across two graphite electrodes in an inert atmosphere. Other techniques applied to synthesize fullerenes include using negative ion/desorption chemical ionization techniques and a benzene flame. The most common method for synthesis today is the Huffman-Krätschmer carbon arc method. It consists of heating pure carbon in the form of graphite to plasma temperatures by using graphite electrodes in an inert atmosphere (usually helium). This leads to the creation of a soot, from which the fullerenes may be separated. Approximately 10 to 15 percent of the soot contains soluble fullerenes.

The separated crude fullerene mixture consists of 65 to 85 percent $C_{60}$ and 10 to 30 percent $C_{70}$, with higher fullerenes making up the balance of material. Such higher fullerenes include all fullerenes greater than $C_{70}$ and generally include the $C_{72}$–$C_{200}$ as the soluble fullerenes.

Due to their highly similar structure, solubility, and reactivity, the only characteristic that significantly differentiates the various fullerenes is their molecular weight. Such similarities have made separation of the discrete fullerene components difficult. Many methods have been tried in an attempt to separate fullerenes but, until recently, few methods were successful.

Most known separation methods employ a column chromatography technique. Column chromatography uses a tube that is open at the top with a valve at the bottom to control the flow of liquid through the tube. The column is filled with a substance that has some affinity for the material that one is trying to separate (stationary phase). Prior to entering the column, the material to be separated is usually dissolved. After placing the material to be separated into the column, a solvent is poured through the column. The material to be separated has some affinity to the column's stationary phase and some affinity to the solvent, so it moves through the tube slower than the solvent. The various molecules one is trying to separate will have differing amounts of affinity to the stationary phase and a "banded" separated product will result.

Most attempts to separate fullerenes have required the use of large amounts of stationary phase and solvent and an inordinate amount of time to separate. The use of standard silica gel alone as the chromatography stationary phase does not work effectively and neutral alumina requires prohibitively large solvent volumes.

Fullerenes also have low solubilities in many common solvents, like hexane. Their low solubility in inexpensive, common solvents, contributes to the ineffectiveness of performing separations on common stationary phases such as silica gel. Continued investigation of the potential utility of these materials is dependent on developing separation methods which facilitate isolation of gram quantities of fullerenes.

Recently, it was discovered that the use of an activated charcoal and silica gel mixture can provide adequate and cost effective separation of gram quantities of $C_{60}$ and $C_{70}$. As disclosed in U.S. Pat. No. 5,310,532, which is incorporated herein in its entirety by reference, Tour et al. found that activated charcoal columns containing Norit-A and silica gel efficiently separated $C_{60}$. Further development led to a method for isolation of $C_{70}$ by modifying the mobile phase. This process is disclosed in U.S. patent application Ser. No. 08/238,640 (filed on May 5, 1994) to Tour et al.), which is incorporated herein in its entirety by reference. These two developments have enabled the production of gram quantities of $C_{60}$ and $C_{70}$ fullerenes. Even with these improved techniques, however, the separation of gram quantities of $C_{70}$ takes about 20 hours and a chromatography column one meter long. In addition, neither of these methods allows efficient isolation of gram quantities of the higher fullerenes ($>C_{70}$). Although the procedures disclosed in the '532 patent and the '640 patent application work well for obtaining $C_{60}$ and $C_{70}$ fullerenes, the processes do not sufficiently separate the fullerenes greater than $C_{70}$. These methods result in a coeluted mixture of the higher fullerenes.

A GPC method of separating fullerenes has been tried previously. In particular, standard gel permeation columns utilizing nonfunctionalized polystyrene as the stationary phase have been investigated. In such procedures, the stationary phase nonfunctionalized polystyrene has been highly crosslinked and highly porous. The amount of crosslinker utilized has usually been on the order of 10 to 20 percent by weight of the monomer. Such separation techniques have been unsuccessful in obtaining substantial amounts of separated fullerenes. These techniques have been completely unsuccessful in separating the higher order fullerenes above $C_{70}$.

The desirability of obtaining purified fullerenes is indicated by typical prices on the market. Using today's separation techniques, $C_{70}$ fullerenes can cost $325/gram (98% purity), $C_{76}$ can cost $40/milligram (95% pure), and $C_{84}$ can cost $30/milligram (95% pure). Typically the higher fullerenes are sold as a mixture of $C_{84}$ and above fullerenes. Such unseparated mixtures can typically cost $15/milligram.

Higher fullerenes are currently separated either by high pressure liquid chromatography (HPLC) employing the Buckyclutcher I stationary phase, or by gel permeation chromatography (GPC). These methods of purification, however, have limitations. For example, they typically (1) have limited load capacities, (2) exhibit poor resolution of the higher fullerenes, (3) require multiple (as many as 30) passes through the column to obtain even sub-milligram amounts, and (4) require expensive specialty columns for efficient separation. Additionally, in order to maintain adequate separation profiles on most high pressure liquid chromatography-based stationary phases, potent fullerene solvents cannot be used, thereby inhibiting the dissolution of the higher fullerenes.

These current techniques simply do not provide adequate higher fullerene separations on a preparative scale. It would be desirable to develop procedures that could be used to isolate macroscopic quantities of the higher fullerenes.

SUMMARY OF THE INVENTION

It is an object of the present invention to provide a process for separating fullerenes.

It is another object of the present invention to provide a process for separating fullerenes into relatively discrete molecular weight components.

Another object of the present invention is to provide a process which allows the obtaining of higher fullerenes in an enriched form.

It is a further object of the present invention to provide separated $C_{60}$, $C_{70}$, and higher fullerenes in a relatively pure form.

These and other objects are achieved by providing a method of separating fullerenes by using a chromatography column having a functionalized aromatic-containing resin therein, saturating that resin with a solvent which is capable of solubilizing fullerenes, placing a solution of crude fullerenes onto the resin in the column, and then eluting the crude fullerenes with additional solvent to separate the crude fullerenes into selected fullerene molecular weight components. More specifically, a method is provided wherein a halogenated polystyrene resin is used as the stationary phase in a chromatography column and a halogenated aromatic is used as the solvent. Even more specifically, the present method utilizes a halogenated styrene resin as the stationary phase component of the chromatographic process and a halogenated benzene as the solvent. Finally, even more specifically, the stationary phase resin is based on poly(dibromostyrene)/divinylbenzene and the solvent is chlorobenzene. The process allows separation into purified forms of higher fullerenes which have heretofore been unobtainable.

Other objects, features and aspects of the present invention are discussed in greater detail below.

DETAILED DESCRIPTION OF PREFERRED EMBODIMENT

It is to be understood by one of ordinary skill in the art that the present discussion is a description of exemplary embodiments only and is not intended as limiting the broader aspects of the present invention, which broader aspects are embodied in the exemplary construction.

Generally speaking, the present invention is directed to a method using column chromatography for separating crude fullerenes into discrete fullerene components. In particular, the present invention relates to a method of purifying a mixture of crude fullerenes to obtain a preparation enriched in a fullerene of a selected molecular weight or fullerenes of selected molecular weights. The method comprises adding a mixture of crude fullerenes to a column which houses a functionalized aromatic-containing resin, passing a solvent in which the selected molecular weight fullerene(s) is (are) soluble through the column, and recovering a fraction enriched in the fullerene(s) of the selected molecular weight (s) from the column. The disclosed method provides an effective means for separating $C_{60}$, $C_{70}$ and higher fullerenes into selected molecular weight components. Although the process may be conducted in one pass of solvent through the column, additional passes will result in better separation. Furthermore, additional techniques can be performed so as to improve the efficiency of the process. For example, pressure or the like may be added in plant scale processes to provide additional separation enhancements. Crosslinking amounts in the stationary phase resin may also be varied to optimize the separation process.

The present process allows the use of inexpensive monomers that can be easily polymerized into stationary phase beads by standard polymerization techniques. The present process also permits the use of potent fullerene solvents.

Suitable resins for use as the stationary phase in the chromatography column include those polymeric resins containing an aromatic compound that has been substituted with a functional group so that it becomes a "functionalized" aromatic. Among such suitable aromatic-containing resins are the aromatic-containing vinyl polymers, polyacrylates, polycarbonates, polyimides, polyamides, polymethacrylates that contain aromatic units, and aromatic polyesters. In particular, polystyrenes, including the aromatic-substituted, halogen-substituted and halogenated aromatic-substituted styrenes, are suitable. Specifically, highly suitable resins include polymerized polystyrene/divinylbenzene, poly-4-naphthyl styrene/divinylbenzene, poly-4-chlorostyrene/divinylbenzene, and poly(dibromostyrene)/divinylbenzene.

Generally speaking, compounds having the following formula are useful as the stationary phase of the chromatography column in the present invention:

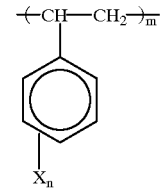

wherein m is a positive integer; n=1, 2, 3, 4, or 5; X is chosen from the group consisting of (1) halogens, such as chlorine, bromine, iodine and fluorine, (2) aromatics, such as phenyl or naphthyl, and (3) halogenated aromatics, such as p-chlorophenyl, p-bromophenyl, p-iodiophenyl, p-fluorophenyl, and 2,4-dibromophenyl. In this formula, the position of X on the phenyl ring is variable.

The polymeric resins may be polymerized into beads for using as the stationary phase in the chromatography column by any known polymerization method. Examples of such polymerization methods include suspension polymerization and emulsion polymerization reactions which generally use free radical initiators such as 2,2'-azobisisobutyronitrile (AIBN), and the peroxides. In addition, light and heat polymerization techniques can be utilized. After polymerization, the beads may be treated as typical for removing or washing away unreacted monomer prior to use in the column.

The size of the beads produced during the polymerization process and used during separation is not particularly important to the present process. However, in the examples below, 200–400 mesh (37–74 micrometer diameter) beads were utilized. Larger beads result in a more rapid throughput through the column, and smaller beads allow for more separation per weight of stationary phase.

Various crosslinkers may be used during the polymerization reaction for forming the stationary phase beads. A crosslinking agent in a ratio of about 0.5 percent to about 50 percent by weight to the monomer component may be used. Generally, any di-alkenyl moiety that is normally used in vinyl polymerization techniques can be used. For example, divinylbenzene and divinylnaphtheylene are suitable crosslinkers for forming the stationary phase polymeric resins.

Various fullerene solvents may be used in the present invention. Generally, the halogenated, dihalogenated, and trihalogenated aromatics are appropriate for use. However, non-aromatics, such as carbon disulfide and liquid carbon dioxide may also be used as the solvent. In particular, chlorobenzene, due to its relatively low cost and wide availability, is particularly suitable in the present invention.

Examples of other fullerene solvents that may also be used include benzene, toluene, ethylbenzene, n-propylbenzene, iso-propylbenzene, n-butylbenzene, sec-butylbenzene, tert-butylbenzene, 1,2-dimethylbenzene, 1,3-dimethylbenzene, 1,4-dimethylbenzene, 1,2,3-trimethylbenzene, 1,2,4-trimethylbenzene, 1,3,5-trimethylbenzene, 1,2,3,4-tetramethylbenzene, 1,2,3,5-tetramethylbenzene, fluorobenzene, chlorobenzene, bromobenzene, iodobenzene, 1,2-dichlorobenzene, 1,2-dibromobenzene, 1,3-dichlorobenzene, 1,3-dibromobenzene, 1,2,4-trichlorobenzene, 1-methyinaphthalene, 1-bromo-2-methyinaphthalene, quinoline, pyridine, and thiophene.

The process for carrying out the separation procedure is as follows. First, solid resin particles are formed so that they can be used as a stationary phase in the chromatography column. As described above, various polymerization techniques may be used to obtain solid polymeric particles having varying sizes and shapes. Generally, the particles will be in the shape of beads having a 200–400 mesh size.

The solid particles are then introduced into a chromatography column. Generally, such columns are made of glass, steel, or other suitable material. After loading into the column, in one particular embodiment, the solvent to be used as the mobile phase during the separation process is poured into the column to saturate the stationary phase. The mixture of crude fullerenes is then introduced into the top of the column and additional solvent is passed through the column. While the additional solvent flows downward, the crude fullerenes separate into bands of relatively discrete molecular weight components. Each band of relatively discrete selected molecular weight fullerenes may then be drawn off the column through the stopcock located at the lower end of the chromatography column.

The following examples are meant to be exemplary procedures only which aid in the understanding of the present invention. The invention is not meant to be limited thereto.

EXAMPLE 1

A polydibromostyrene-divinylbenzene stationary phase resin was prepared by a suspension polymerization technique as follows:

Inhibitor-free dibromostyrene (90 g, 50 mL, 344 mmol) obtained from Great Lakes Chemicals (reported by the manufacturer to be a mixture of the following isomers: 3,4-dibromostyrene (43%), 2,4-dibromostyrene (27%), 4-bromostyrene (15%), 2,5-dibromostyrene (10%), 2,4,5-tribromostyrene (5%)), purified by passage through neutral alumina, and divinylbenzene (2.7 g, 3.0 mL, 21 mmol) (technical grade, a mixture of isomers, purchased from Aldrich), also purified by passage through neutral alumina, were mixed with AIBN (400 mg, 2.44 mmol) (purchased from Pfaltz and Bauer), without purification, and added to a solution of methyl cellulose (2.0 mg) (purchased from Fisher, viscosity of 1500 centipoise), without purification, in 400 mL of deionized water. These components were stirred in an industrial blender (Waring two-speed commercial blender, model 5011, with a standard offset four blade stirrer) set at low for 8 minutes.

The resulting poly(divinylbromostyrene)/divinylbenzene (PDBS/DVB) suspension was then heated at 75° C. for two days. The formed polymer beads were then poured into a 43 mm×123 mm Soxhlet thimble and extracted with acetone for 12 hours. The beads were dried in a vacuum oven at 45° C. (2.0 mm Hg) overnight. The beads that had aggregated into clumps were gently ground with a mortar and pestle and size fractionated using stainless steel full-height laboratory sieves. The 200–400 mesh (37–74 $\mu$m) particle size range was chosen for gravity column chromatography. The polymerization afforded 73 grams (79% yield, mass to mass) of the resin and 41 grams (44% overall) of the particles obtained had the desired 200–400 mesh particle size.

EXAMPLE 2

A fullerene separation according to the present invention was then performed as follows:

A slurry of the PDBS/DVB stationary phase (140 g) made in Example 1 and chlorobenzene (250 mL) solvent was permitted to stand for 1 hour to permit swelling of the resin before pouring into a 4.5×60 cm glass column that had a cotton plug at the bottom and a 500 mL solvent reservoir at the top. The slurry was allowed to settle and the solvent drained until the solvent was about 1 millimeter above the stationary phase. The stationary phase was not allowed to become solvent free.

A homogeneous saturated chlorobenzene (20 mL) solution of crude fullerenes (100.4 mg) extracted from carbon arc soot was slowly poured onto the top of the PDBS/DVB stationary phase. The soot had been formed by the carbon arc method and extracted with toluene and sonication as described in Scrivens, W. A., Tour, J. M., 57 *J. Org. Chem.* pp. 6932–6936 (1992). (Most of the $>C_{100}$ fullerenes, therefore, were not present in this sample since their solubility in toluene is minimal.) The mixture was then eluted, under gravity pressure, at a flow rate of 1 mumin using chlorobenzene as the mobile phase.

The separation resulted in seven distinct colored bands visually distinguished as they moved through the column. Each band was collected and purity was determined by C-18 reverse phase high pressure liquid chromatography using a 55:45 MeOH-toluene mixture at a flow rate of 1 mL/min and UV detection at 340 nm. The results of the purity test are indicated below in Table 1.

TABLE 1

| Band Number | Band Color | Constituent(s) (% purity) | Isolated Weight (mg) |
|---|---|---|---|
| 1 | purple | $C_{60}$ (99.3) | 51.2 |
| 2 | dark brown | $C_{70}$ (98.8) | 19.3 |
| 3 | golden | $C_{76}$ (30.0) $C_{78}$ (61.1) | 0.7 |
| 4 | golden gray | $C_{78}$ (98.7) | 2.0 |
| 5 | olive | $C_{84}$ (84.3) $C_{86}$ (10.0) | 10.9 |
| 6 | light gray | $C_{90}, C_{92}$ (mix, 100) | 1.0 |
| 7 | dark gray | $C_{90}, C_{92}$ (mix, 10.9) $C_{94}, C_{96}$ (mix, 89.1) | 10.0 |

In the above table, the lower band numbers indicate faster elution rates. The peak identities were determined relative to authentic samples of the fullerene molecular weight components. For the constituents in band Nos. 6 and 7, the broadened peaks did not have adequate resolution to permit quantitation of each of the two components in the mixture.

Ninety-five percent of the original material weight applied to the column was recovered. Therefore, unlike alumina or charcoal stationary phase recoveries for $C_{60}$ and $C_{70}$ purifications, the present process resulted in little irreversible adsorption during the chromatographic process. The total volume of chlorobenzene needed for the recovery of all seven bands was 3 liters, though nearly all of the solvent (more than 95 percent) was easily recovered and reused throughout the purification process by rotary evaporation using an ice water-cooled condenser.

The inventive process resulted in preparative separation that permitted a high level of separation for a single column elution of mixed fullerenes. The column is reusable simply by washing with chlorobenzene and there was no noticeable decomposition of the stationary phase column material after multiple runs. In fact, the efficiency of the column actually improved slightly after the first use.

EXAMPLE 3

Example 2 was repeated using 1,2-dichlorobenzene as the solvent.

EXAMPLE 4

Example 2 was repeated using 1,2,4-trichlorobenzene as the solvent.

EXAMPLE 5

Example 2 was repeated using toluene as the solvent.

Of all the examples, chlorobenzene as the solvent gave the optimal separation for fullerenes in the >$C_{100}$ range. In addition, preliminary results have indicated that 1,2,4-trichlorobenzene is a suitable mobile phase for preparing fullerene mixtures highly enriched in $C_{100}$–$C_{200}$ using the PDBS/DVB stationary phase described here.

Use of PDBS/DVB is only one example of the stationary phase that may be used. This particular stationary phase was chosen because of its low cost resulting from bulk production of the monomer whose polymer is commonly used as a flame retarding additive for commoditive plastics, its ease of producing large quantities by suspension polymerization, its acceptability to a wide range of fullerene solvents which may be used and its easy reusability.

Various additional process steps may also be utilized. For example, diluents, such as silica gel, activated charcoal, alumina, and diatomeceous earth, may be used to dilute the beads with other stationary phases. Such diluent additions will alleviate compaction in the column and increase throughput. The amount of crosslinking agent in the stationary phase resin may also be varied to enhance the separation process. In addition, multiple passes of the solvent may be utilized to further enhance elution. Finally, various known commercial and plant scale processes may be utilized such as increased pressure (on the order of 5 p.s.i. to 5,000 p.s.i.) commonly used in high pressure liquid chromatography.

Although a preferred embodiment of the invention has been described using specific terms, devices, and methods, such description is for illustrative purposes only. The words used words of description rather than of limitation. It is to be understood that changes and variations may be made by those of ordinary skill in the art without departing from the spirit and scope of the present invention which is set forth in the following claims. In addition, it should be understood that aspects of the various embodiments may be interchanged, both in whole or in part.

What is claimed is:

1. A method for separating and purifying a mixture of fullerenes to obtain a preparation enriched in a fullerene of a selected molecular weight comprising:
    a) providing a column having a functionalized aromatic-containing resin therein;
    b) adding a fullerene mixture to said column;
    c) passing a solvent in which said selected molecular weight fullerene is soluble through said column; and
    d) recovering a fraction enriched in the fullerene of the selected molecular weight from the column.

2. A method for separating and purifying a mixture of fullerenes to obtain a preparation enriched in a fullerene of a selected molecular weight comprising:
    a) providing a column with a functionalized aromatic-containing resin therein;
    b) saturating said resin with a solvent in which said selected molecular weight fullerene is soluble;
    c) providing a fullerene mixture to said column so that the mixture falls onto said resin; and
    d) eluting said fullerene mixture with additional said solvent to separate and recover said selected molecular weight fullerene.

3. The method claim 2, wherein said functionalized aromatic-containing resin is a halogenated styrene.

4. The method of claim 2, wherein said solvent is a halogenated aromatic.

5. The method of claim 2, wherein said solvent is a halogenated benzene.

6. The method of claim 2, wherein said functionalized aromatic-containing resin is a halogenated styrene and said solvent is a halogenated benzene.

7. The method of claim 2, wherein said functionalized aromatic-containing resin is dibromostyrene/divinylbenzene.

8. The method of claim 2, wherein said solvent is chlorobenzene.

9. The method of claim 2, wherein said functionalized aromatic-containing resin is polydibromostyrene/divinylbenzene and said solvent is chlorobenzene.

10. The method of claim 2, wherein said solvent is chosen from the group consisting of halogenated aromatics, carbon disulfide and liquid carbon dioxide.

11. The method of claim 2, wherein said functionalized aromatic-containing resin is chosen from the group consisting of aromatic-substituted styrenes, halogen-substituted styrenes, and halogenated aromatic-substituted styrenes, and said solvent is selected from the group consisting of halogenated aromatics, dihalogenated aromatics, trihalogenated aromatics, carbon disulfide and liquid carbon dioxide.

12. The method of claim 2, further comprising the step of eluting said mixture with solvent at least two times.

13. The method of claim 2, wherein said solvent is driven through said column by applying 5 p.s.i. to 5,000 p.s.i. to one end of said column.

14. The method of claim 2, wherein said fullerene of selected molecular weight is a $C_{60}$ fullerene.

15. The method of claim 2, wherein said fullerene of selected molecular weight is a $C_{70}$ fullerene.

16. The method of claim 2, wherein said fullerene of selected molecular weight is a fullerene above $C_{70}$.

17. The method of claim 2, wherein said functionalized aromatic-containing resin comprises a crosslinking agent in the range of from about 0.5 percent to about 50 percent by weight relative to the weight of the monomer from which said resin is made.

18. The method of claim 7, wherein said divinylbenzene is present in said resin in an amount of about 5 percent by weight relative to the weight of dibromostyrene.

19. A method of purifying and separating a mixture of fullerenes to obtain a preparation enriched in a fullerene of a selected molecular weight comprising:

a) providing a polymerized resin to a chromatographic column, said polymerized resin being chosen from the group consisting of polystyrene/divinylbenzene, poly-4-chlorostyrene/divinylbenzene, poly-4-napthylstyrene/divinylbenzene, and polydibromostyrene/divinylbenzene;

b) passing a solvent selected from the group consisting of aromatics, halogenated hydrocarbons, halogenated aromatics, carbon disulfide and liquid carbon dioxide through said column; and c) recovering a fraction enriched in the fullerene of the selected molecular weight from the column.

* * * * *